(12) United States Patent
Couwenhoven et al.

(10) Patent No.: US 6,312,101 B1
(45) Date of Patent: Nov. 6, 2001

(54) METHOD OF PRINTING DIGITAL IMAGES USING MULTIPLE COLORANTS HAVING SUBSTANTIALLY THE SAME COLOR

(75) Inventors: Douglas W. Couwenhoven, Fairport; Kevin E. Spaulding, Spencerport; Rodney L. Miller, Fairport, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/455,981

(22) Filed: Dec. 6, 1999

(51) Int. Cl.[7] .................................................. B41J 2/21
(52) U.S. Cl. ............................ 347/43; 347/15; 358/298
(58) Field of Search ................................ 347/12, 15, 40, 347/41, 43; 358/298, 534

(56) References Cited

U.S. PATENT DOCUMENTS

| 4,604,654 | 8/1986 | Sakurada et al. ............... 358/298 |
| 4,635,078 | * 1/1987 | Sakurada et al. ............... 347/43 |
| 4,672,432 | 6/1987 | Sakurada et al. ............... 347/43 |
| 4,727,436 | 2/1988 | Kawamura et al. ............. 347/15 |
| 5,142,374 | 8/1992 | Tajika et al. .................... 347/15 |
| 5,729,259 | * 3/1998 | Gotoh et al. .................... 347/43 |
| 6,014,457 | * 1/2000 | Kubo et al. ..................... 382/167 |

OTHER PUBLICATIONS

*Digital Halftoning*, by Robert Ulichney, 3rd edition (1990), MIT press, ISBN 0-262-21009-6.
International Color Consortium (ICC) Specification ICC.1:1998-09, "File Format for Color Profiles".

* cited by examiner

*Primary Examiner*—N. Le
*Assistant Examiner*—Lamson D. Nguyen
(74) *Attorney, Agent, or Firm*—Raymond L. Owens

(57) ABSTRACT

A method for reproducing digital images having at least one color channel containing pixels using a digital printer having a set of colorants is disclosed. Two or more of the colorants of the set have substantially the same color but different densities. Printer code values for a particular color channel are used to control colorant amounts for the two or more colorants.

22 Claims, 11 Drawing Sheets

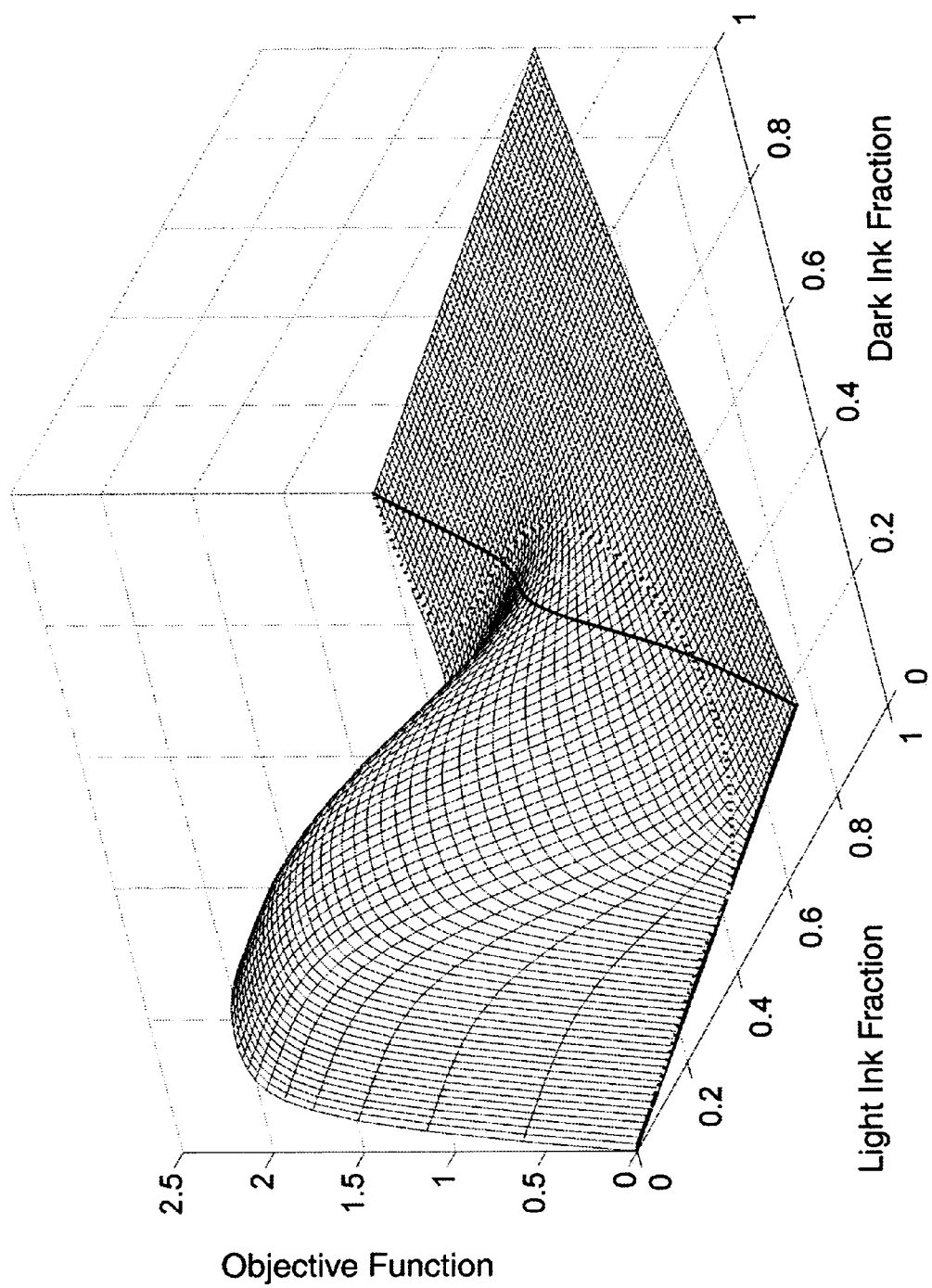

METHOD OF PRINTING DIGITAL IMAGES USING MULTIPLE COLORANTS HAVING SUBSTANTIALLY THE SAME COLOR

FIELD OF THE INVENTION

The present invention relates to printing digital images using a digital printer having two or more colorants that have substantially the same color, but different densities.

BACKGROUND OF THE INVENTION

In the field of digital printing, a digital printer receives digital data from a computer and places colorant on a receiver to reproduce the image. A digital printer may use a variety of different technologies to transfer colorant to the page. Some common types of digital printers include inkjet, thermal dye transfer, thermal wax, electrophotographic, and silver halide printers.

It is a common goal in the field of digital printing to continually improve the quality of the output print, particularly when printing digital images of photographs. In recent years, advances in the technology related to digital printing have provided much opportunity for improving the quality of the output, particularly in the field of inkjet printing. An inkjet printer reproduces an image by ejecting small drops of ink from a printhead containing nozzles, where the ink drops land on a receiver medium (typically paper) to form ink dots. A typical inkjet printer reproduces a color image by using a set of color inks, usually cyan, magenta, yellow, and black. Often, the dots produced by the inkjet printer are visible to the human eye, and result in an undesirable noise or "grainy" appearance to the reproduced image. Modern inkjet printers typically reproduce images using smaller ink drops than their predecessors, thus reducing the visibility of the ink dots and therefore improving the image quality. Another technique employed by some modem inkjet printers to reduce the grainy appearance of reproduced images is to use multiple inks of the same color, but different densities, such as a light cyan and a dark cyan ink. The light ink dots are less visible to the human eye than the dark ink dots, and regions of the image reproduced with the light ink will appear less grainy than if a dark ink had been used to reproduce the same region.

One problem with using multiple inks of the same color to reduce the graininess of a printed image is that the total amount of ink that is placed on the page is increased. It is commonly known in inkjet printing that poor image quality can result when too much ink is printed on the page. For example, excessive ink can cause the receiver to physically warp or deform. Too much ink can also result in ink "bleeding", where ink flows across the surface of the receiver from one area to another, resulting in undesired image artifacts and poor image quality. In addition to the potential poor image quality that results from using excessive ink, it is also more costly to operate the printer due to the greater ink usage. It is therefore advantageous to minimize the total amount of ink used to reproduce an image.

U.S. Pat. No. 4,604,654 to Sakurada et. al., describes a printer in which a light ink is used primarily in highlight regions of the image, and a dark ink is used primarily in the shadows, with the midtones being generally reproduced with a combination of the two inks. While this arrangement does provide for reduced image noise, it completely neglects the issue of the total ink amount that gets placed on the page, and could result in the undesired image artifacts described above. U.S. Pat. No. 5,142,374 to Tajika et. al., describes an inkjet et printer in which the light and dark inks are used with different dot sizes or resolutions. This art also provides for reduced graininess of the printed image, but does not consider the amount of ink that is being placed on the page, or the negative image quality artifacts that may occur. Related art describing similar printers are described in U.S. Pat. Nos. 4,635,078, 4,672,432, and 4,727,436, but the total amount of ink that is used is ignored in all of these references.

SUMMARY OF THE INVENTION

It is an object of the present invention to overcome the disadvantages of the prior art and provide a method for producing high quality images on a digital printer where multiple colorants of the same color are used.

It is another object of the present invention to produce high quality images while minimizing the total amount of colorant such as ink used and the perceived graininess of the printed image.

These objects are achieved by a method for reproducing digital images having at least one color channel containing pixels using a digital printer having a set of colorants, wherein two or more of the colorants of the set have substantially the same color but different densities, and input code values for a particular color channel are used to control colorant amounts for said two or more colorants, comprising the steps of:

a) forming a look-up table for each of the two or more colorants, said look-up table producing a colorant control signal as a function of an input code value for the particular color channel and wherein each control signal individually corresponds to a colorant;

b) addressing the look-up tables with the input code value for each pixel of the digital image to determine the colorant control signal for each of the two or more colorants; and c) controlling the digital printer using the colorant control signal to control the colorant amount for each of the two or more colorants in the process of reproducing the digital image.

ADVANTAGES

The present invention has an advantage in that it provides for printing high quality images on a digital printer such as an inkjet printer. When an inkjet printer is used having multiple inks of the same color, the total amount of ink is minimized as well as reducing the perceived graininess of the image. Minimizing the total amount of ink used to print an image is advantageous because of the absence of image quality artifacts such as bleeding and cockling, and the reduced operating cost associated with reduced ink usage. The present invention achieves these benefits while maintaining excellent image quality by ensuring that the perceived graininess of the image is simultaneously minimized along with the ink usage.

BRIEF DESCRIPTION OF THE DRAWINGS

FIG. 8 is a plot showing the optimized path and the prior art path through the metric function;

DETAILED DESCRIPTION OF THE INVENTION

This invention describes a method of printing high quality digital images on a digital printer having a set of colorants wherein at least two of the colorants have substantially the same color but different densities. An example of such a printer is an inkjet printer in which a light cyan and light magenta ink are used in addition to a standard set of cyan, magenta, yellow, and black inks.

Figure 1:
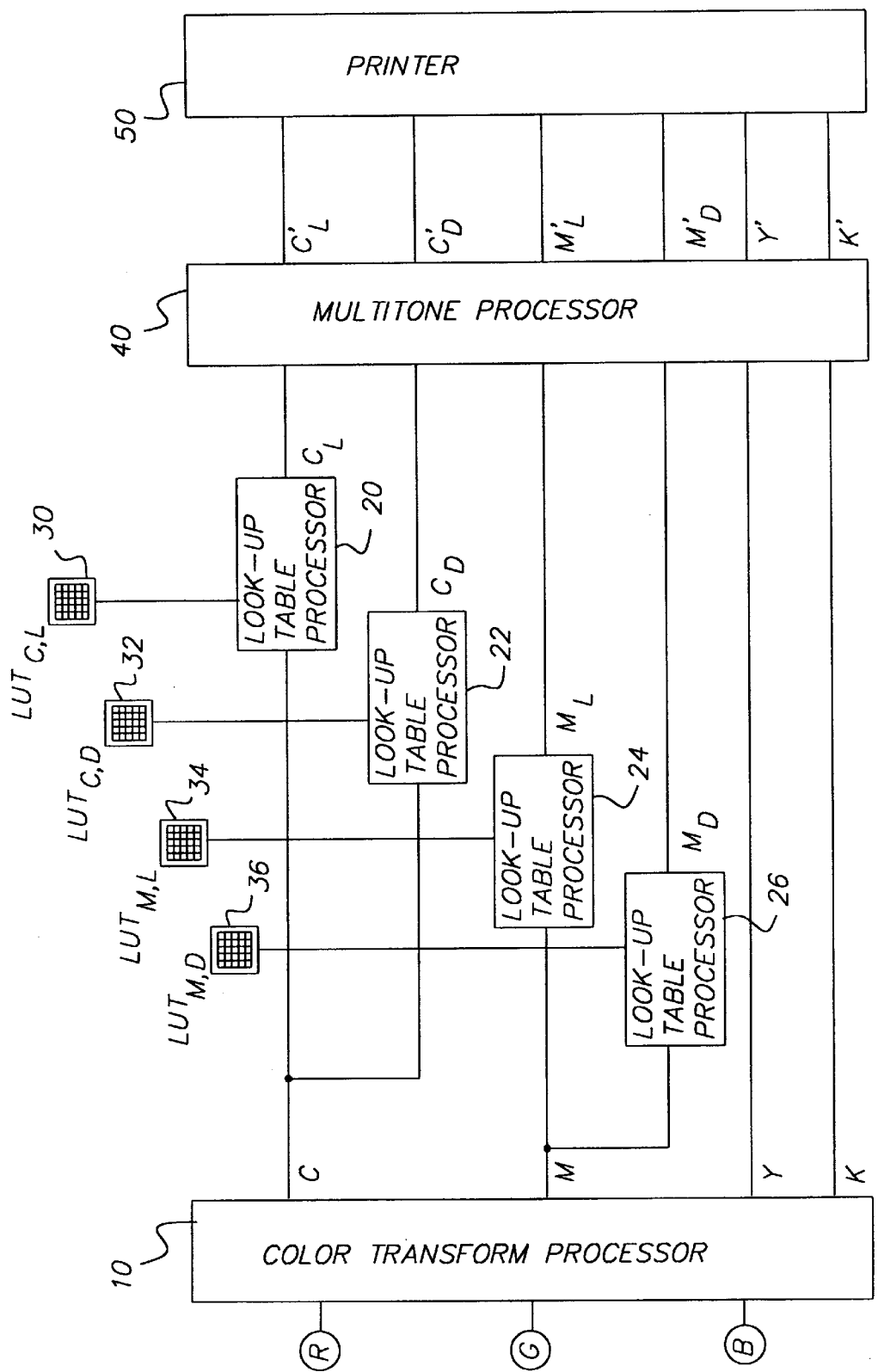
FIG. 1 is an image processing block diagram of a printer system incorporating the present invention.

A digital image may be represented by an array of individual picture elements, or pixels, that describe the density or color of the image at a single point. Each pixel contains a digital code value, typically represented as an integer number on the range {0,255} for each color channel of the image. Referring to FIG. 1, which shows an image processing block diagram for a digital printer matching the above description, an input image having pixels typically consisting of red (R), green (G), and blue (B) code values is input to a color transform processor 10 which converts the image code values into a set of printer code values, typically cyan (C), magenta (M), yellow (Y) and black (K) corresponding to the colors of the inks used in a typical inkjet printer. This color transform may be implemented in a variety of ways, including profiles in the format defined by the International Color Consortium (ICC), a.k.a ICC profiles. A look-up table processor 20 then converts the cyan printer code value C into a light cyan colorant control signal $C_L$ using a light cyan look-up table 30. Another look-up table processor 22 converts the cyan printer code value C into a dark cyan colorant control signal $C_D$ using a dark cyan look-up table 32.

$$C_L(C) = LUT_{C,L}(C)$$

$$C_D(C) = LUT_{C,D}(C)$$

The light and dark magenta colorant control signals are created in a similar fashion from the magenta printer code value using look-up table processors 24, 26 and the light and dark magenta look-up tables 34, 36. In this example, only a single yellow and black ink are used, so that the yellow and black colorant control signals are set equal to the yellow and black printer code values, respectively, as shown in FIG. 1. In general, multiple yellow and black inks may be used also, as well as multiple inks of different colors, such as orange or green.

A multitone processor 40 converts the colorant control signals {$C_L$, $C_D$, $M_L$, $M_D$, Y, K} into multitoned colorant control signals {$C'_L$, $C'_D$, $M'_L$, $M'_D$, Y', K'}. The multitoned colorant control signals will generally have fewer discrete levels than the colorant control signals. For example, a simple inkjet printer can produce two levels represented by one or zero dots. For such a printer, the multitone processor would produce multitoned colorant control signals for each channel that have only two discrete levels corresponding to the two levels that the printer can produce. Modern inkjet printers may produce many more than two levels per color channel, but typically the number of levels is less than 256, and a multitone processor is necessary. Many types of multitone processors are applicable to a system incorporating the present invention, including error diffusion, blue noise dither, clustered dot dither, and others. Those skilled in the art will recognize that the type of multitone processor used is not paramount to the present invention.

The multitoned colorant control signals are then sent to a digital printer 50, which deposits ink on the page in response to the multitoned colorant control signals to reproduce the image.

The contents of the look-up tables 30, 32 control how the light and dark cyan inks will be printed in response to the cyan printer code value. Thus, the contents of the look-up tables 30, 32 fundamentally control the total amount and proportions of the light and dark cyan inks that are placed on the page for a given cyan printer code value. The look-up tables 30, 32 are optimally constructed according to the present invention by following the procedure described herein below. Look-up tables 34, 36 corresponding to the magenta channel are optimally constructed by following the same procedure.

Figure 2:
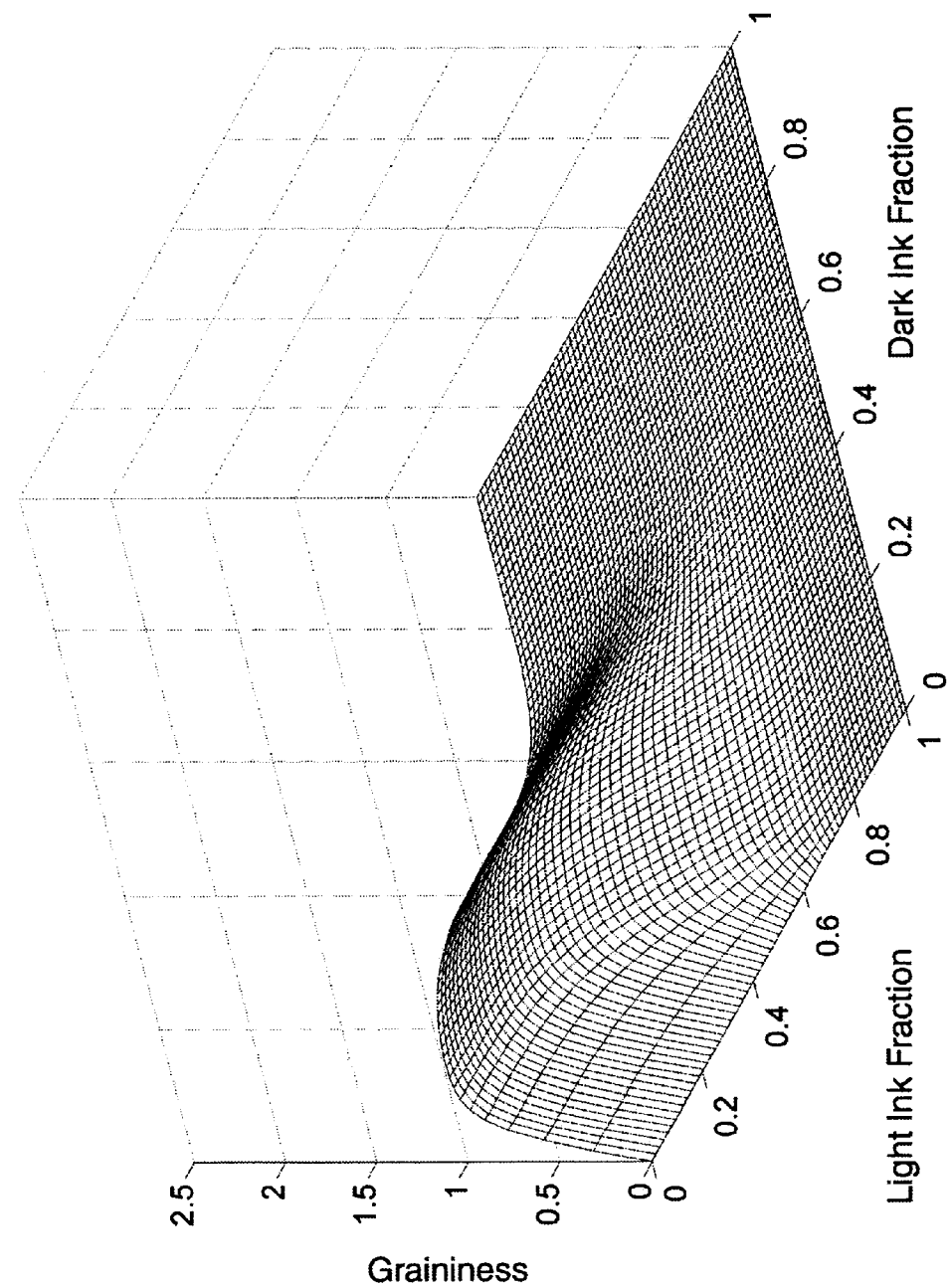
FIG. 2 is a plot of the graininess of patches printed with various combinations of light and dark ink.

For a given cyan printer code value C, the look-up tables 30, 32 will dictate a light cyan colorant control signal $C_L$ and a dark cyan colorant control signal $C_D$ that ultimately specify the amount of light cyan and dark cyan ink to be used. The multitone processor 40 converts the colorant control signals into spatial patterns of dots that are printed on the page by the digital printer 50. Depending on the amounts of light and dark cyan ink that are used, the printed patterns will be more or less visible to the human eye. Highly visible patterns give the image a "grainy" or "noisy" appearance, and are therefore undesirable. FIG. 2 shows a plot of the perceived graininess as a function of the light and dark ink amounts for a typical inkjet printer. A larger value for the graininess indicates that the printed pattern of dots is more visible, and therefore more objectionable to the observer. As seen in FIG. 2, the graininess is larger when small combinations of light and dark ink are placed on the page. The perceived graininess of a pattern can be determined by many methods. One such method is to simply print a test image containing a variety of patterns and ask a panel of human observers to rate the graininess of each pattern. Another method is to compute the graininess from instrumented measurements of the patterns according to an equation. One such equation is:

$$G(C_L, C_D) = \int\int |P_{C_L, C_D}(f_x, f_y) VTF(f_x, f_y)|^2 df_x df_y$$

where P is the frequency spectrum measured from a printed test patch containing light and dark ink amounts specified by $C_L$ and $C_D$, and VTF is the human visual system transfer function, given by:

$$VTF(f_x, f_y) = \begin{cases} 2.2(0.192 + 0.114 f_r) e^{-(0.114 f_r)^{1.1}}, & f_r > f_{max} \\ 1.0, & \text{otherwise} \end{cases}$$

-continued where $f_r = \frac{\sqrt{f_x^2 + f_y^2}}{s(\theta)}$ and $s(\theta) = 0.15\cos(4\theta) + 0.85$ and $\theta = \arctan\left(\frac{f_y}{f_x}\right)$ and $f_x, f_y$ are the horizontal and vertical spatial frequencies, respectively. Those skilled in the art will realize that there are many equations and types of measurement that can produce a graininess value suitable for use in the present invention, and that the specific form of the equation is not paramount to the invention.

Figure 3:
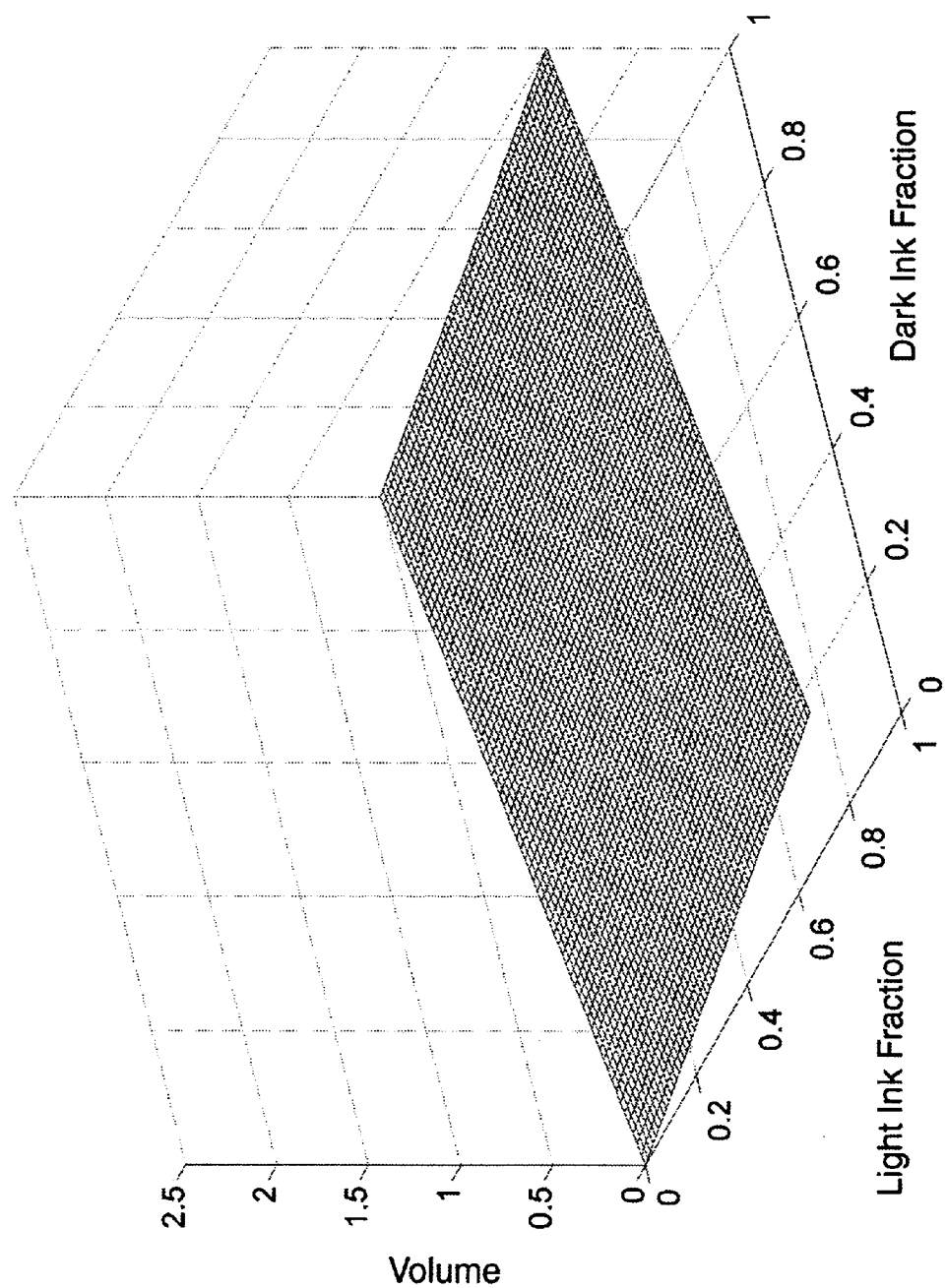
FIG. 3 is a plot of the total ink volume of patches printed with various combinations of light and dark ink.

For a typical inkjet printer, the total volume of ink that is placed on the page by a particular combination of $C_L$ and $C_D$ can be computed according to:

$$V(C_L, C_D) = V_L(C_L) + V_D(C_D)$$

where $V_L(C_L)$ is the volume of light ink per unit area deposited on the page by the printer in response to the light ink control signal $C_L$, and $V_D(C_D)$ is the volume of dark ink per unit area deposited on the page by the printer in response to the dark ink control signal $C_D$. FIG. 3 shows a plot of the total ink volume V as a function of the light and dark ink amounts for a typical printer. As seen from FIG. 3, the volume increases as the printer places a higher fraction of each ink on the page. As discussed earlier, the less volume of ink that is used to reproduce an image, the more generally desirable it is, due to the minimization of the aforementioned image artifacts associated with printing high volumes of ink.

Figure 4:
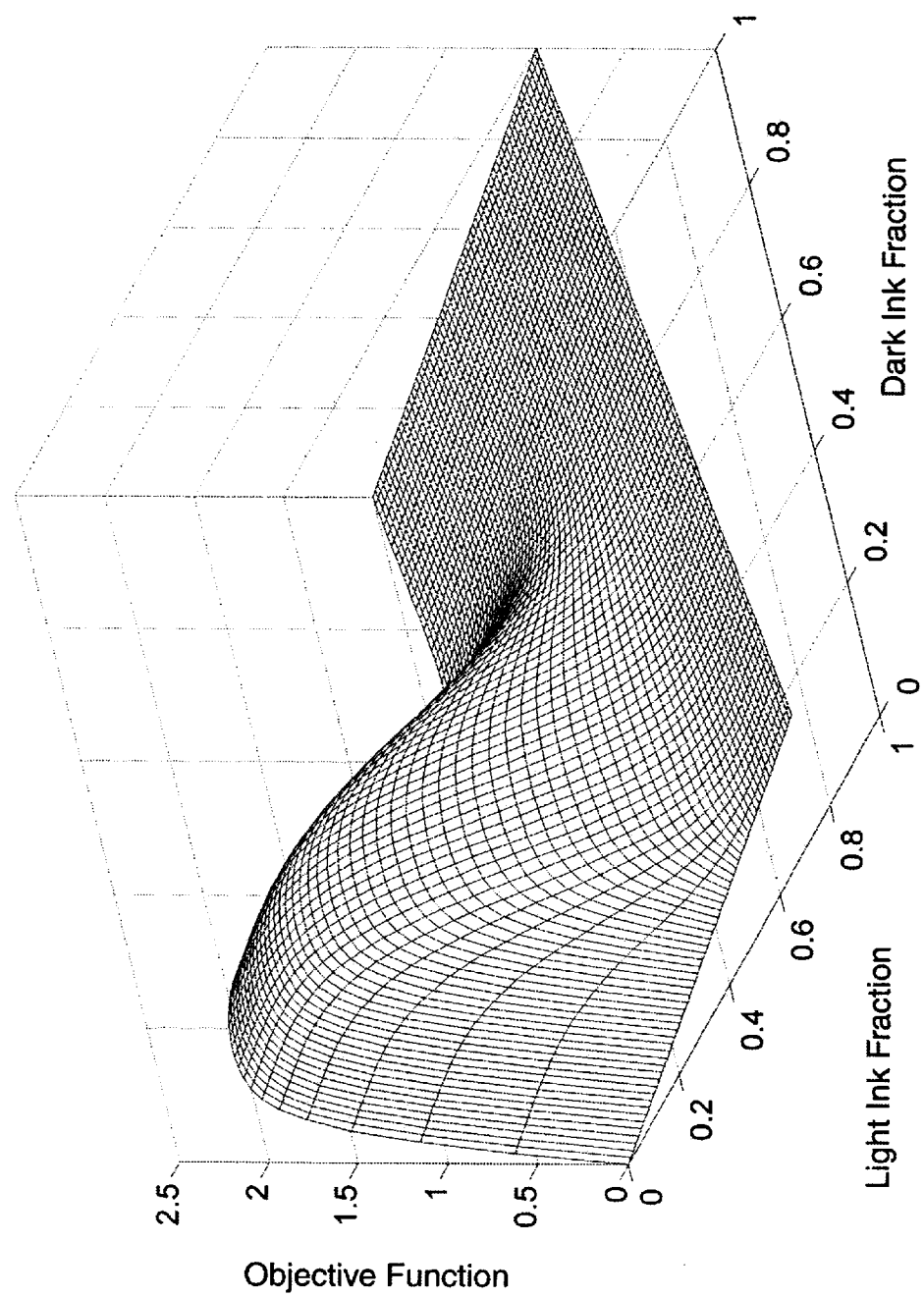
FIG. 4 is a plot of a metric function patches printed with various combinations of light and dark ink.

Given the graininess and volume functions described above, a general metric function can be constructed according to the following equation:

$$M(C_L, C_D) = \alpha G(C_L, C_D) + \beta V(C_L, C_D)$$

where $\alpha$ and $\beta$ are constants. This equation results in a metric function value for each combination of $C_L$, $C_D$. Larger values of the metric function indicate less desirable $C_L$, $C_D$ combinations, and smaller values for the metric function indicate more desirable $C_L$, $C_D$ combinations. FIG. 4 shows the metric function M plotted as a function of the $C_L$, $C_D$ fractions for values $\alpha=2$ and $\beta=1$. In a preferred embodiment of the present invention, the constants $\alpha$ and $\beta$ are adjusted to indicate the relative importance of graininess and total ink volume to the particular inkjet printing application. For example, in printing of signage, the total ink volume may be more important than the graininess, and the constants might be chosen such that $\beta>\alpha$. However, in printing of photographs, the graininess may be more important, and the constants might be chosen such that $\alpha>\beta$. While the values of the constants $\alpha$ and $\beta$ are important in determining the behavior of the printing system, it should be noted that the present invention will apply to any values chosen for $\alpha$ and $\beta$.

Figure 5:
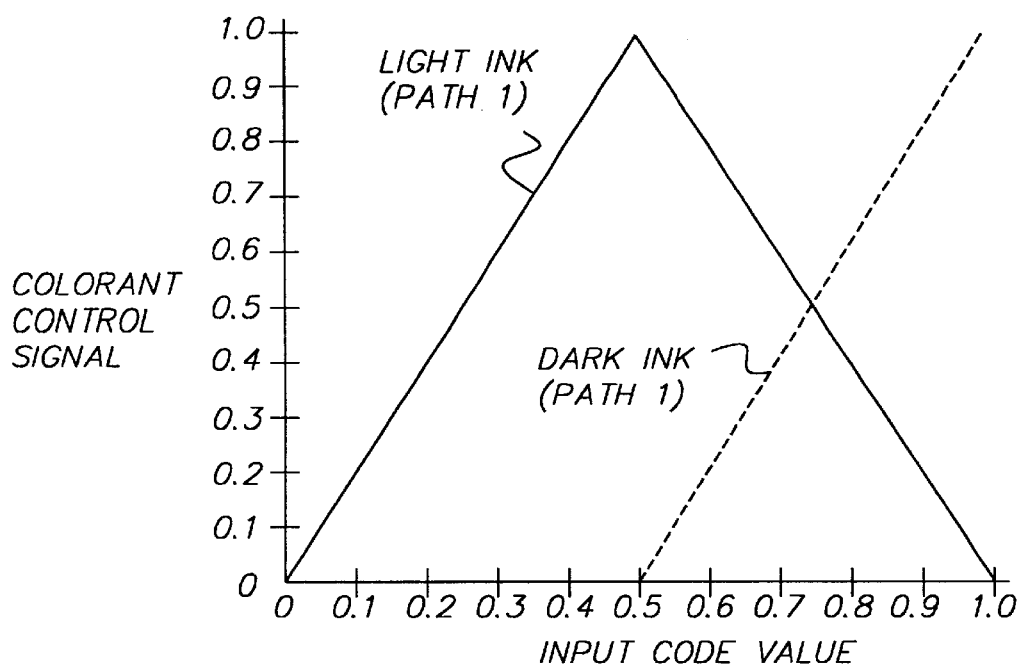
FIG. 5 is a plot of prior art look-up tables.
Figure 6:
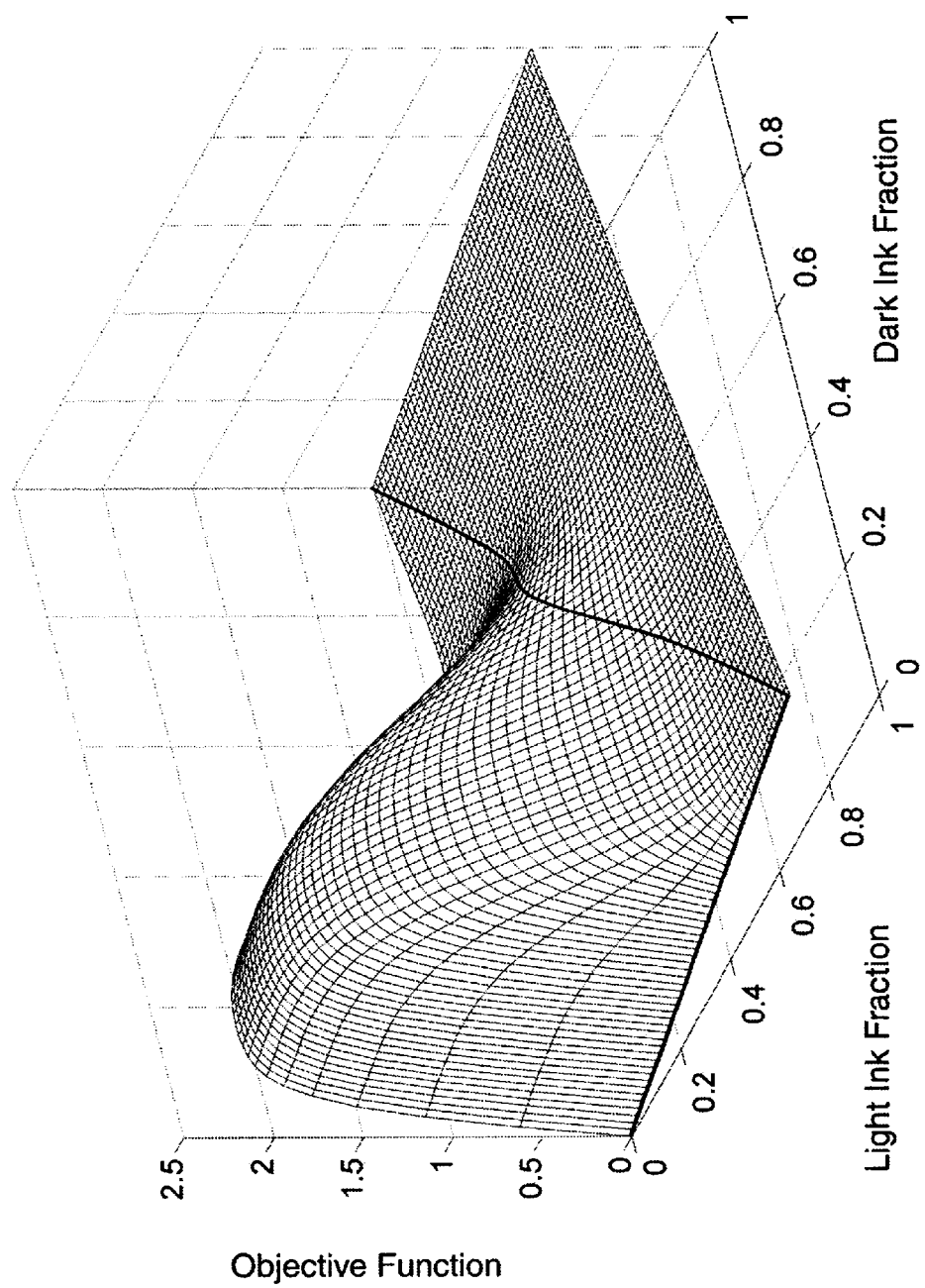
FIG. 6 is a plot of the prior art path through the metric function.

Turning now to FIG. 5, the contents of the look-up tables 30, 32 as disclosed by the method of Tajika et al are plotted. These look-up tables describe the cyan density tonescale of a system in which the light cyan ink is increased until it fully covers the page, and then the dark cyan ink is added until it fully covers the page while the light ink is simultaneously removed. It can be seen that these look-up tables define a path through the two dimensional $C_L$, $C_D$ ink fraction space, and the value of the metric function M evaluated along this path is shown in FIG. 6. Note that the path cuts across a corner of the "hump" defined by the metric function, indicating the use of less desirable $C_L$, $C_D$ ink combinations in the middle portion of the tonescale. Thus, the path defined by the prior art look-up tables of FIG. 5 clearly is not optimal, as poor image quality will result in the center portion of the tonescale, and too much ink will unnecessarily be used in other portions.

The present invention describes a method of optimally deriving the look-up tables 30, 32, 34, 36 of FIG. 1 to overcome the non-optimal shortcomings of the prior art look-up tables. To accomplish this, an objective function is created that accounts for the value of the metric function M along the entire tonescale path defined by the look-up tables. An example of such an objective function, $M_{path}$, is given by the following equation:

$$M_{path} = \sum_C M(C_L, C_D) = \sum_C M(LUT_{C,L}(C), LUT_{C,D}(C))$$

Figure 13:
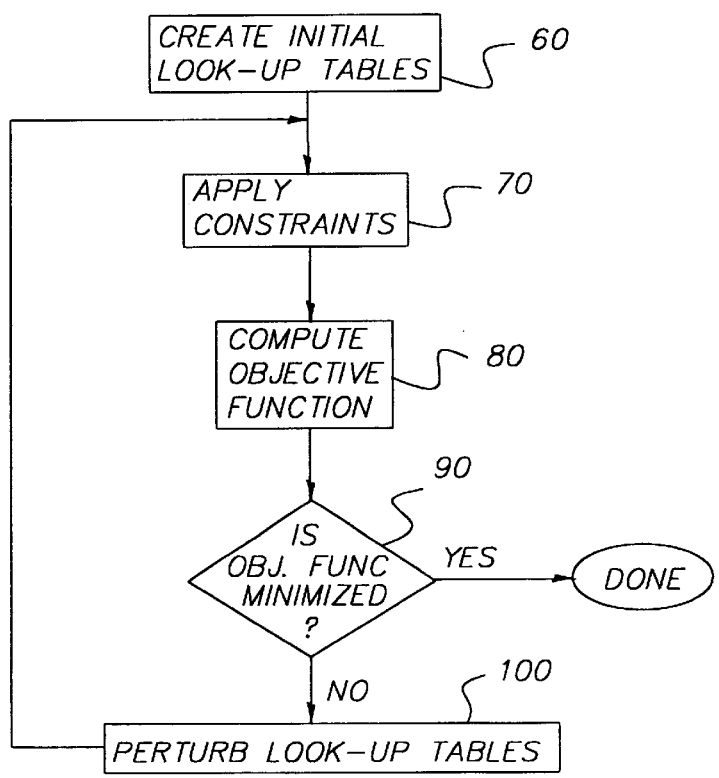
FIG. 13 is a logic flow diagram showing the look-up table optimization process.

This objective function is essentially the integral of the metric function along the path defined by the look-up tables $LUT_{C,L}$ and $LUT_{C,D}$. One skilled in the art will recognize that other objective functions certainly exist that are suitable for use in the present invention. In the objective function given above, a smaller value for $M_{path}$ indicates a better choice for the look-up tables $LUT_{C,L}$ and $LUT_{C,D}$. According to the present invention, the objective function is then used in a constrained minimization process as illustrated in the process flow diagram of FIG. 13, in which an initial set of look-up tables 60 are created, and a set of constraints 70 are applied to the look-up tables to produce candidate look-up tables. The objective function 80 is then computed for the candidate look-up tables, and compared to previous values of the objective function corresponding to previous candidate look-up tables. If the minimization process meets some termination criteria 90 (such as number of iterations, detection of the global minimum solution, etc), then the process terminates and the optimal look-up tables are created. Otherwise, the candidate look-up tables are perturbed 100 according to a set of rules governed by the particular minimization algorithm, and these look-up tables are fed back to the next iteration of the process. One skilled in the art will recognize that many different types of constrained minimization algorithms can be applied to the present invention, and that the optimal look-up tables derived will differ slightly depending on the particular algorithm chosen.

Figure 7:
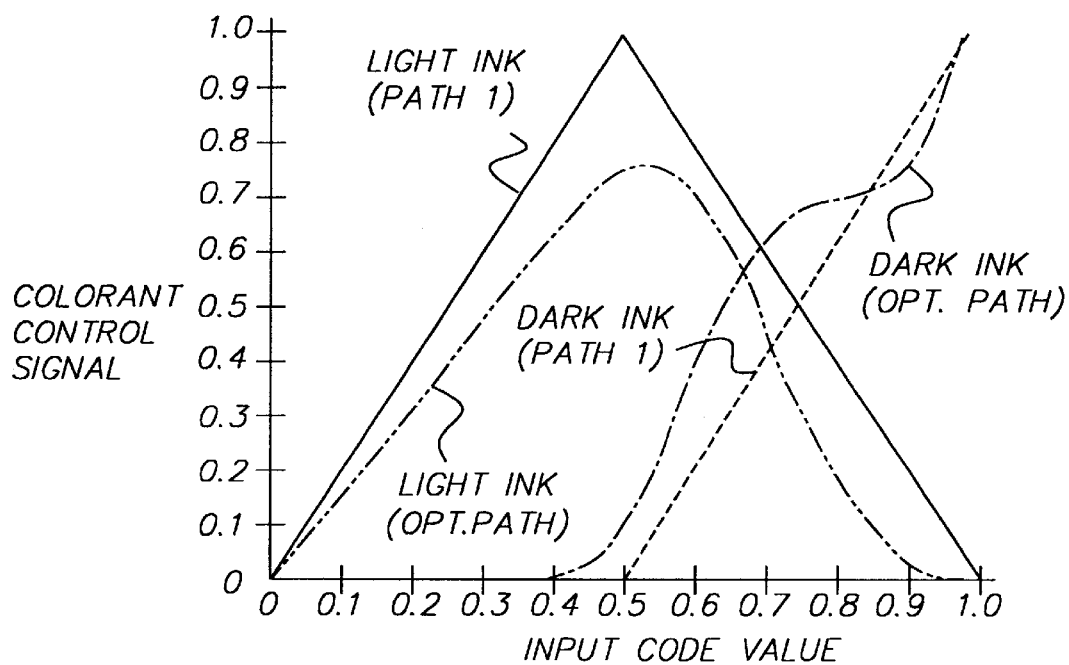
FIG. 7 is a plot showing the optimized look-up tables of the present invention and the prior art look-up tables.

Turning now to FIG. 7, the optimized look-up tables are plotted along with the prior art look-up tables of FIG. 5, which were used as the initial look-up tables for the optimization process. FIG. 8 shows the metric function with paths defined by the optimized look-up tables of FIG. 7 (shown as a dotted line) and the prior art look-up tables of FIG. 5, shown as a solid line. Several important differences between these two paths should be noted. First, the optimized path avoids crossing the "hump" of the metric function in the central portion of the tonescale, indicating that better image quality will be obtained. Second, the optimized path does not go all the way to full coverage of the light ink before it starts to use the dark ink. In other words, the optimized path bends around the contour of the metric function to minimize the total amount of ink used while maximizing the image quality. It should also be noted that since both paths start and end at the same point, then the dynamic range of the printer ($D_{min}$, $D_{max}$) will be the same. For these reasons, the optimized look-up tables are advantaged relative to the prior art.

Figure 9:
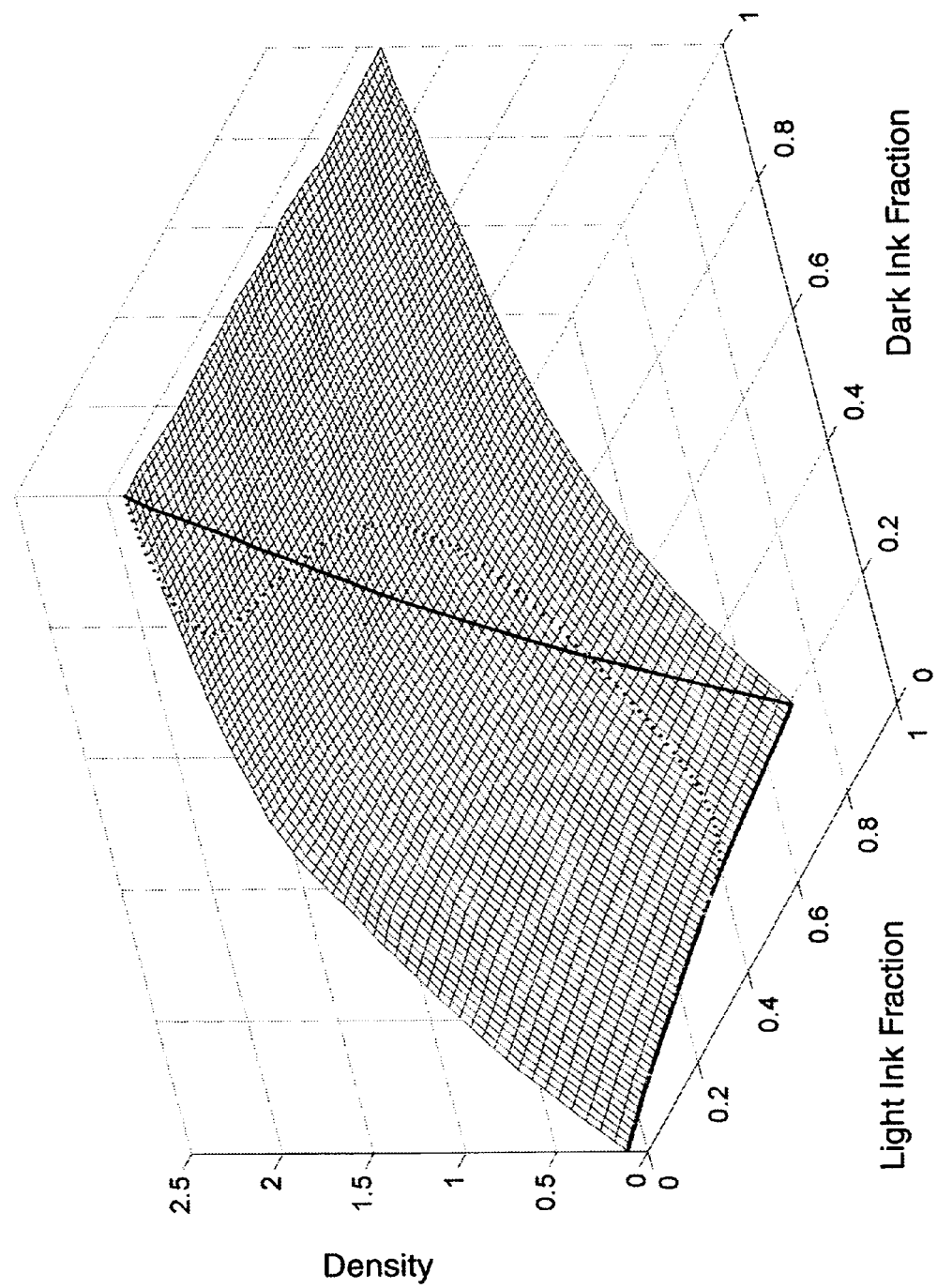
FIG. 9 is a plot showing the optimized path and the prior art path through the density.

In the constrained minimization process used to produce the optimized look-up tables, a set of constraints 70 were applied. In this section, the types of constraints that can be applied and their effects on the optimal look-up tables will be discussed. One important constraint that controls the selection of the optimal solution is a density monotonicity constraint. This means that each point along the path specified by the optimal look-up tables must produce a density greater than the previous point. It is well known in the art that this is a desirable attribute of a printing system. Turning now to FIG. 9, the density as a function of the light and dark ink amounts is shown, along with the prior art path (solid line) and the optimal path (dotted line). It can be seen from the curved nature of the density surface that it is possible to specify a path that violates the density monotonicity constraint, but both the prior art and optimal paths satisfy the constraint.

A slightly stronger version of the density monotonicity constraint is the density derivative threshold constraint. This constraint simply means that the density must not only be monotonic, but that the density difference between any two adjacent points along the path must be greater than a non-zero threshold. This may be advantageous in certain printing systems where low slopes of the density tonescale can sometimes cause difficulties in calibrating the printer tonescale.

Another constraint on the optimal path solution that may be advantageous when performing tonescale calibration is a density smoothness constraint. This constraint simply means that abrupt changes in the density derivative should be avoided. This corresponds to having look-up tables that define smooth, rounded paths, such as the optimal path shown in FIG. 9, and avoid sharp corners, such as are present in the prior art path of FIG. 9.

In parallel to the density constraints discussed above, there may be situations where similar constraints may be advantageously applied to the total colorant amount. For example, some inkjet printing algorithms, such as ink depletion (or ink limiting) require that code value is monotonic with the colorant amount (or ink volume). Thus, it is advantageous to construct the look-up tables such that this constraint is satisfied. For similar reasons, a slightly stricter colorant amount derivative threshold constraint may be applied, in which the colorant amount is not only monotonic with code value, but has a derivative that exceeds a non-zero threshold.

An additional constraint that may be applied on the colorant amount is to constrain the relative amounts of the light and dark inks that are used. A printer system implementing optimal look-up tables may not use equal amounts of the light and dark ink. This may be disadvantageous if the ink supply cartridges for the light and dark inks are the same size. The user may end up replacing one cartridge much more often than the other, or even worse, if the two cartridges are bound together, the user may be forced to discard a cartridge that is partially full of one of the inks. Thus, it may be advantageous to constrain the look-up table optimization procedure so that a desired ratio of light and dark inks are used. The relative amount of light and dark inks may alternatively be considered as part of the objective function rather than a constraint. This may be preferable, depending on the printer system, since it will increase the probability of converging to a solution. In this case, the objective function might become:

$$M_{path} = \gamma \sum_C M(LUT_{C,L}(C), LUT_{C,D}(C)) + \delta \text{abs} \left( \frac{\sum_C h(C) V_L(C_L)}{\sum_C h(C) V_D(C_D)} - R \right)$$

where h(C) is the expected histogram of cyan printer code values, "abs" is the absolute value function, $\gamma$ and $\delta$ are constants, and R is a desired light to dark ink usage ratio. The second term of the above equation represents the difference between the ratio of light ink usage to dark ink usage for the candidate look-up tables and the desired ratio. This is just one example of how the objective function may be modified to include a particular attribute. Other attributes may be desirable depending on the characteristics of the printer system, and could be added to the objective function as additional terms.

Figure 10:
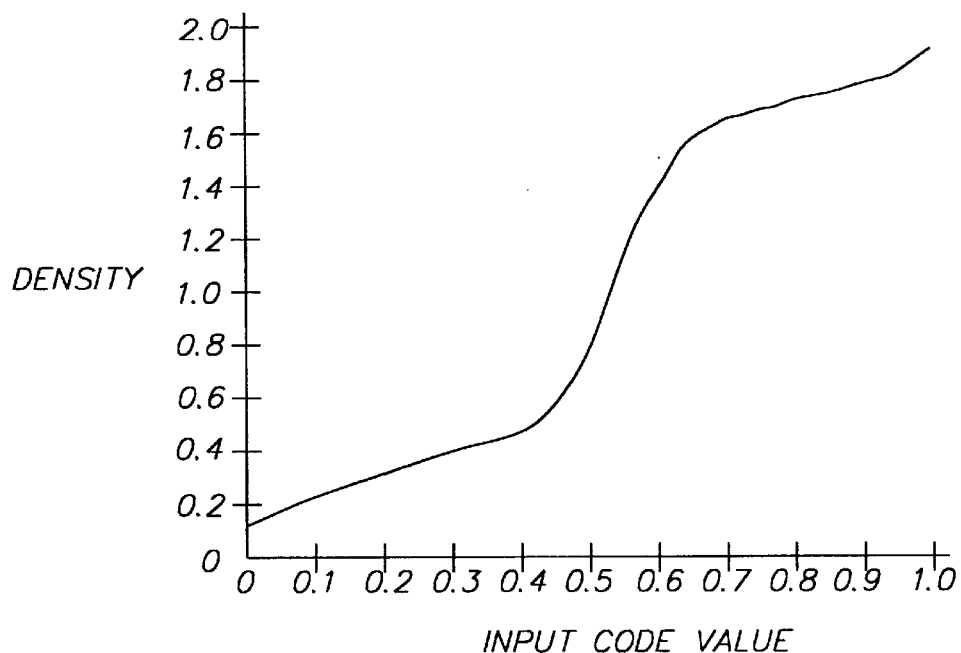
FIG. 10 is a plot showing the density tonescale of the optimized look-up tables.
Figure 11:
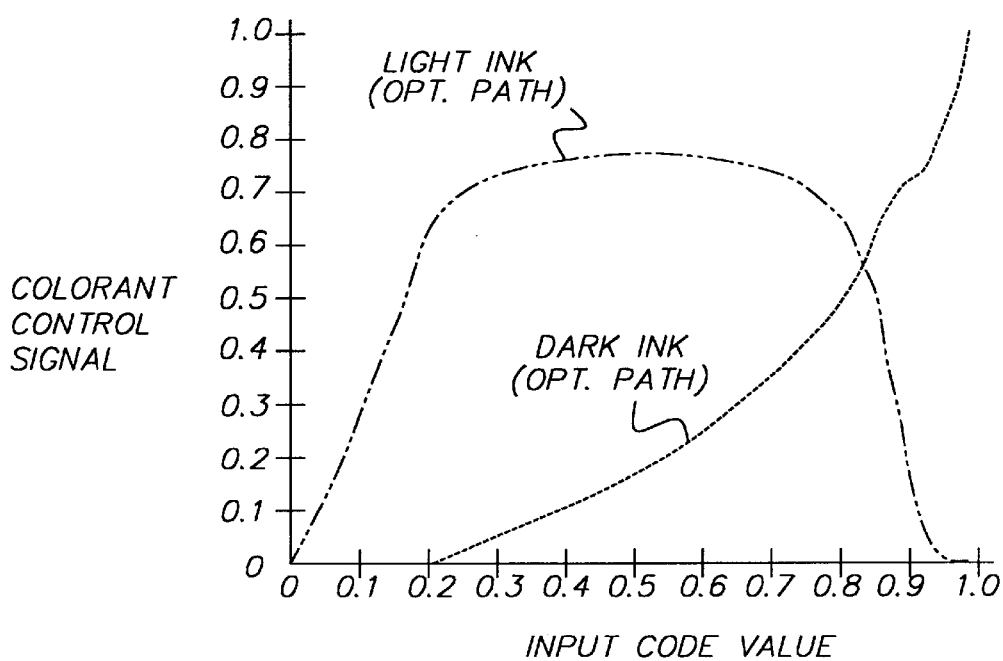
FIG. 11 is a plot of resampled optimized look-up tables.
Figure 12:
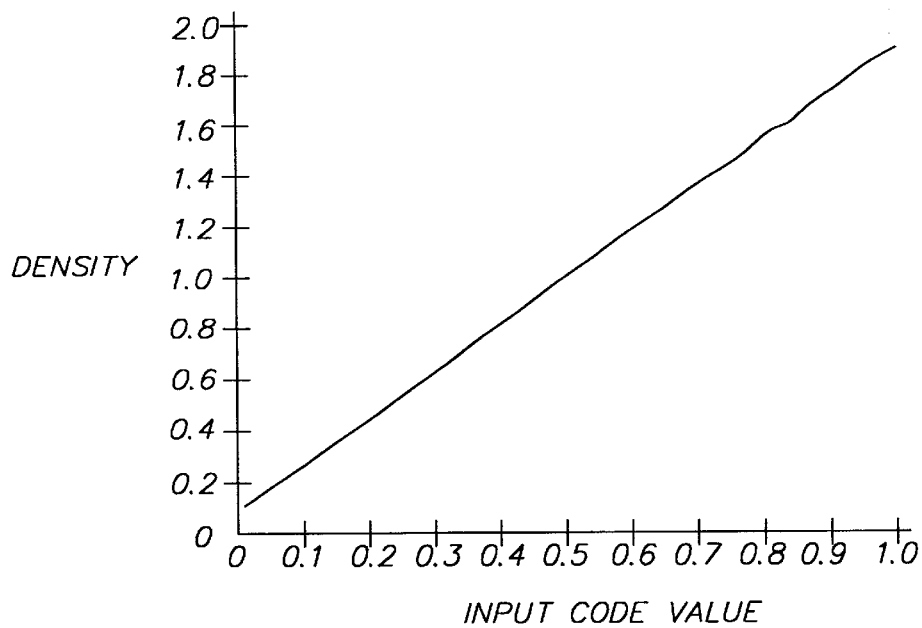
FIG. 12 is a plot showing the density tonescale of the resampled optimized look-up tables.

In addition to density and/or colorant amounts as described above, it may also be desirable to specify the density tonescale to match some aim response. For example, the density tonescale that results from using the optimal look-up tables of FIG. 7 is shown in FIG. 10. As seen from this figure, the density tonescale satisfies the above mentioned constraints in that it is monotonic and smooth, but it is quite non-linear in nature, and is therefore an undesirable tonescale response for a printer. This is easily corrected for by simply resampling the optimal look-up tables of FIG. 7 to produce the resampled optimal look-up tables of FIG. 11. In this example, the resampling process was performed such that the density tonescale response of the printer would be linear, as shown in FIG. 12. In practice, the same procedure can be used to produce any desired tonescale aim, and this process will be easily performed by one skilled in the art.

Figure 14:
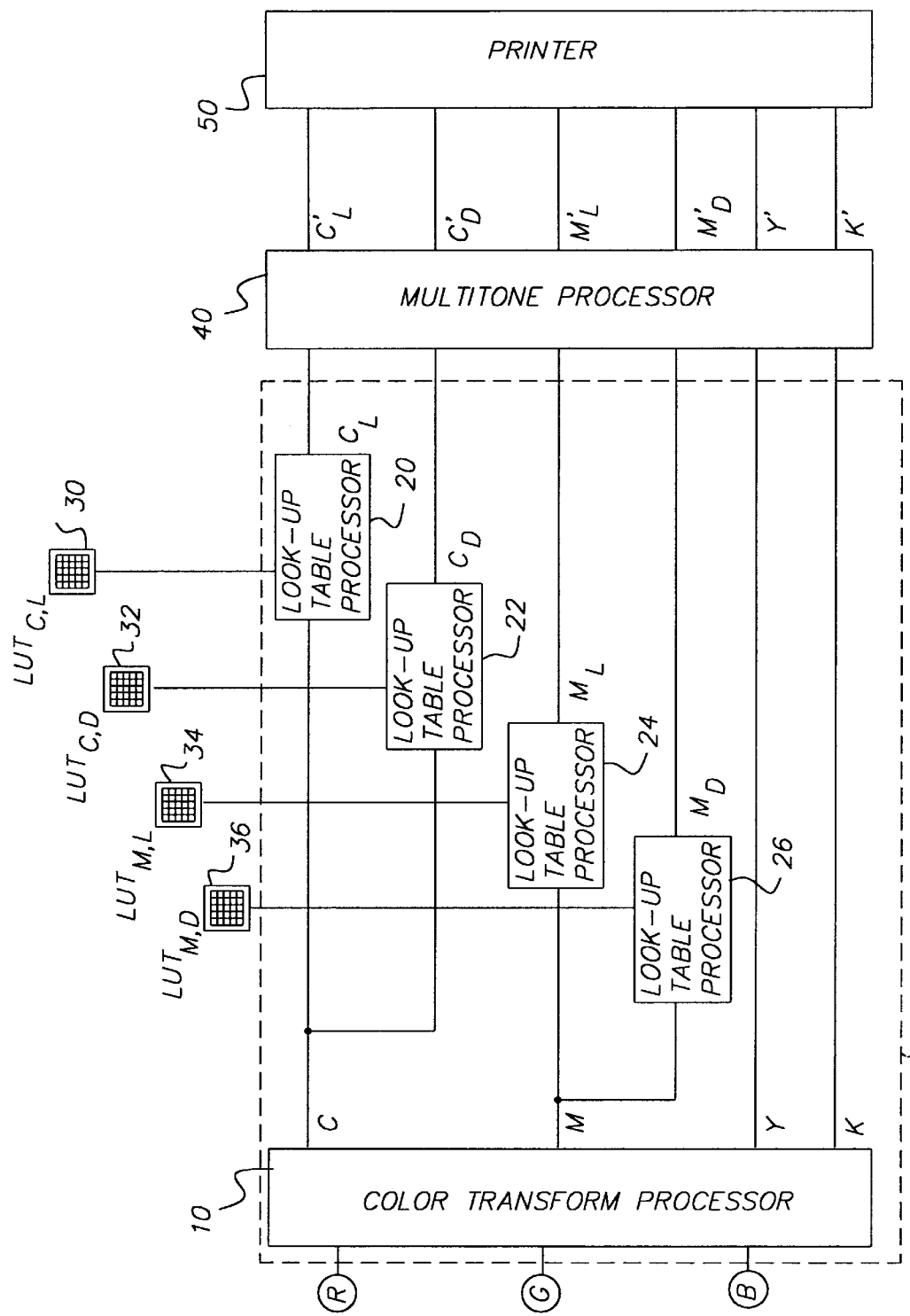
FIG. 14 is another image processing block diagram of a printer system incorporating the present invention.

Turning now to FIG. 14, an advantageous use of the present invention within a modified color transform processor 110 is shown. This figure shows the same image processing block diagram of FIG. 1, with an additional dashed box showing a modified color transform processor 110. Many color transform file formats, such as ICC profiles, allow for the specification of look-up tables to be appended to the color transform. This feature could be used to apply the look-up tables 30, 32, 34, 36 to the data. Alternatively, an ICC profile that encapsulates the look-up table processors 20, 22, 24, 26 could be built and combined with the ICC profile used by the color transform processor 10. The modified color transform processor 100 encapsulates the functionality of the color transform processor 10 with the look-up table processors 20, 22, 24, 26 to specify a single process that transforms the input RGB image code values to the colorant control signals {$C_L$, $C_D$, $M_L$, $M_D$, Y, K}. This arrangement has possible advantages in terms of computational speed, efficiency, and accuracy.

A computer program can be used for performing steps of this invention. It can be provided on a computer readable storage medium. The computer readable storage medium may comprise, for example, magnetic storage media such as magnetic disk (for example, a floppy disk), or magnetic tape, optical storage medium such as optical disk, optical tape or machine readable barcode, solid state electronic storage devices such as random access memory (RAM), or read-only memory (ROM), or any other physical device or medium employed to store the program.

The invention has been described in detail with particular reference to certain preferred embodiments thereof, but it

PARTS LIST 10 color transform processor
20 look-up table processor
22 look-up table processor
24 look-up table processor
26 look-up table processor
30 look-up table
32 look-up table
34 look-up table
36 look-up table
40 multitone processor
50 printer
60 initial look-up tables step
70 apply constraints step
80 compute objective function step
90 termination criteria step
100 perturb look-up tables step
110 modified color transform processor

What is claimed is:

1. A method for reproducing digital images having at least one color channel containing pixels using a digital printer having a set of colorants, wherein two or more of the colorants of the set have substantially the same color but different densities, and printer code values for a particular color channel are used to control colorant amounts for said two or more colorants, comprising the steps of:
   a) forming a look-up table for each of the two or more colorants, wherein the look-up tables are formed by minimizing an objective function, said look-up table producing a colorant control signal as a function of the printer code values for the particular color channel and wherein each control signal individually corresponds to a colorant;
   b) addressing the look-up tables with the printer code values for each pixel of the digital image to determine the colorant control signal for each of the two or more colorants; and
   c) controlling the digital printer using the colorant control signal to control the colorant amount for each of the two or more colorants in the process of reproducing the digital image.

2. The method of claim 1 wherein there are individual colorants in the set different than the two or more colorants including yellow and black colorants.

3. The method of claim 1 wherein the objective function includes a term representing a perceived graininess of the reproduced image as a function of colorant control signal for the two or more colorants.

4. The method of claim 1 wherein the objective function includes a term representing a total colorant amount.

5. The method of claim 1 wherein the objective function includes a term representing relative colorant usage for the two or more colorants.

6. The method of claim 1 wherein the look-up tables are formed subject to a constraint that the colorant amount varies smoothly with the printer code values.

7. The method of claim 1 wherein the look-up tables are formed subject to a constraint that the density of the reproduced image varies smoothly with the printer code values.

8. The method of claim 1 wherein the color of the two or more colorants is neutral.

9. The method of claim 1 wherein the color of the two or more colorants is cyan.

10. The method of claim 1 wherein the color of the two or more colorants is magenta.

11. The method of claim 1 wherein the color of the two or more colorants is yellow.

12. The method of claim 1 further including at least one color channel which does not correspond to multiple colorants having substantially the same color.

13. The method of claim 1 wherein the digital printer is an inkjet printer.

14. The method of claim 13 wherein the colorant control signal controls the colorant amount by adjusting ink dot size.

15. The method of claim 13 wherein the colorant control signal controls the colorant amount by controlling the number of ink drops printed at each pixel.

16. The method of claim 1 wherein the colorant control signal controls a local average colorant amount using a multitoning method to determine which of a set of possible colorant amounts should be printed at each pixel.

17. A method for reproducing color digital images having multiple color channels each containing pixels using a digital printer having a set of colorants, wherein two or more of the colorants of the set have substantially the same color but different densities, and printer code values for a particular color channel are used to control colorant amounts for said two or more colorants, comprising the steps of:
   a) forming a look-up table for each of the two or more colorants, said look-up table producing a colorant control signal as a function of printer code values for the particular color channel and wherein each control signal individually corresponds to a colorant;
   b) combining the look-up tables for the two or more colorants with a multi-dimensional color transformation to form a modified multi-dimensional color transformation;
   c) addressing the modified multi-dimensional color transformation with the input code values for each pixel of the color digital image to determine the colorant control signals for each colorant utilized by the digital printer; and
   d) controlling the digital printer using the colorant control signal to control the colorant amount for each of the two or more colorants in the process of reproducing the digital image.

18. A method for reproducing digital images having at least one color channel containing pixels using a digital printer having a set of colorants, wherein two or more of the colorants of the set have substantially the same color but different densities, and printer code values for a particular color channel are used to control colorant amounts for said two or more colorants, comprising the steps of:
   a) forming a look-up table for each of the two or more colorants wherein the look-up tables are formed subject to a constraint that the density of the reproduced image is monotonic with the printer code values, said look-up table producing a colorant control signal as a function of the printer code values for the particular color channel and wherein each control signal individually corresponds to a colorant;
   b) addressing the look-up tables with the printer code values for each pixel of the digital image to determine the colorant control signal for each of the two or more colorants; and
   c) controlling the digital printer using the colorant control signal to control the colorant amount for each of the two or more colorants in the process of reproducing the digital image.

19. A method for reproducing digital images having at least one color channel containing pixels using a digital printer having a set of colorants, wherein two or more of the colorants of the set have substantially the same color but different densities, and printer code values for a particular color channel are used to control colorant amounts for said two or more colorants, comprising the steps of:

a) forming a look-up table for each of the two or more colorants wherein the look-up tables are formed subject to a constraint that the derivative of the density of the reproduced image with respect to the printer code values is larger than a density derivative threshold, said look-up table producing a colorant control signal as a function of the printer code values for the particular color channel and wherein each control signal individually corresponds to a colorant;

b) addressing the look-up tables with the printer code values for each pixel of the digital image to determine the colorant control signal for each of the two or more colorants; and c) controlling the digital printer using the colorant control signal to control the colorant amount for each of the two or more colorants in the process of reproducing the digital image.

20. A method for reproducing digital images having at least one color channel containing pixels using a digital printer having a set of colorants, wherein two or more of the colorants of the set have substantially the same color but different densities, and printer code values for a particular color channel are used to control colorant amounts for said two or more colorants, comprising the steps of:

a) forming a look-up table for each of the two or more colorants wherein the look-up tables are formed subject to a constraint that a total colorant amount of the reproduced image is monotonic with the printer code values, said look-up table producing a colorant control signal as a function of the printer code values for the particular color channel and wherein each control signal individually corresponds to a colorant;

b) addressing the look-up tables with the printer code values for each pixel of the digital image to determine the colorant control signal for each of the two or more colorants; and c) controlling the digital printer using the colorant control signal to control the colorant amount for each of the two or more colorants in the process of reproducing the digital image.

21. A method for reproducing digital images having at least one color channel containing pixels using a digital printer having a set of colorants, wherein two or more of the colorants of the set have substantially the same color but different densities, and printer code values for a particular color channel are used to control colorant amounts for said two or more colorants, comprising the steps of:

a) forming a look-up table for each of the two or more colorants wherein the look-up tables are formed subject to a constraint that the derivative of the total colorant amount of the reproduced image with respect to the printer code values is larger than a threshold colorant amount derivative, said look-up table producing a colorant control signal as a function of the printer code values for the particular color channel and wherein each control signal individually corresponds to a colorant;

b) addressing the look-up tables with the printer code values for each pixel of the digital image to determine the colorant control signal for each of the two or more colorants; and c) controlling the digital printer using the colorant control signal to control the colorant amount for each of the two or more colorants in the process of reproducing the digital image.

22. A method for reproducing digital images having at least one color channel containing pixels using a digital printer having a set of colorants, wherein two or more of the colorants of the set have substantially the same color but different densities, and printer code values for a particular color channel are used to control colorant amounts for said two or more colorants, comprising the steps of:

a) forming a look-up table for each of the two or more colorants wherein the look-up tables are formed subject to a constraint that the density of the reproduced image as a function of printer code values is calibrated to an aim response, said look-up table producing a colorant control signal as a function of the printer code values for the particular color channel and wherein each control signal individually corresponds to a colorant;

b) addressing the look-up tables with the printer code values for each pixel of the digital image to determine the colorant control signal for each of the two or more colorants; and c) controlling the digital printer using the colorant control signal to control the colorant amount for each of the two or more colorants in the process of reproducing the digital image.

* * * * *